(12) United States Patent
Gitterman

(10) Patent No.: US 12,708,891 B2
(45) Date of Patent: Aug. 18, 2026

(54) REGENERABLE ROTOR AND METHOD OF MANUFACTURE

(71) Applicant: MUNTERS CORPORATION, Amesbury, MA (US)

(72) Inventor: Amit Gitterman, Sandown, NH (US)

(73) Assignee: Munters Corporation, Amesbury, MA (US)

( * ) Notice: Subject to any disclaimer, the term of this patent is extended or adjusted under 35 U.S.C. 154(b) by 715 days.

(21) Appl. No.: 17/989,072

(22) Filed: Nov. 17, 2022

(65) Prior Publication Data

US 2024/0165584 A1 May 23, 2024

(51) Int. Cl.
*B01J 20/26* (2006.01)
*B01J 20/10* (2006.01)
*B01J 20/32* (2006.01)

(52) U.S. Cl.
CPC ............ *B01J 20/262* (2013.01); *B01J 20/10* (2013.01); *B01J 20/3204* (2013.01); *B01J 20/3214* (2013.01); *B01J 20/3272* (2013.01)

(58) Field of Classification Search
CPC ...... B01J 20/262; B01J 20/10; B01J 20/3204; B01J 20/3214; B01J 20/3272; B01J 20/103
See application file for complete search history.

(56) References Cited

U.S. PATENT DOCUMENTS 5,242,473 A 9/1993 Ogasahara
6,093,378 A 7/2000 Deeba et al.
8,808,424 B2 8/2014 Dinnage
9,919,287 B2 3/2018 Meirav et al.
2008/0050298 A1 2/2008 Meyden et al.
2013/0294991 A1* 11/2013 Jones ..................... B01J 20/103 252/184
2017/0225115 A1 8/2017 Eisenberger et al.
2021/0039036 A1 2/2021 Okano
2022/0016598 A1* 1/2022 Pang .................... B01J 20/3064

FOREIGN PATENT DOCUMENTS

EP 2 054 151 B1 8/2018
JP 2021133323 A * 9/2021
WO 2012-109547 A1 8/2012
WO 2012-109550 A1 8/2012
WO 2021-034251 A1 2/2021
WO 2021-150722 A1 7/2021

OTHER PUBLICATIONS

JP 2021133323 A machine translation (Year: 2021).*
Heydari-Gorji et al., "CO2 capture on polyethylenimine-impregnated hydrophobic mesoporous silica: Experimental and kinetic modeling", Chemical Engineering Journal 173, 2011, 72-79 (Year: 2011).*
International Search Report and Written Opinion dated Apr. 15, 2024, in PCT International Application No. PCT/US23/79389.

* cited by examiner

*Primary Examiner* — Michael Forrest
*Assistant Examiner* — Nicole Lee Quist
(74) *Attorney, Agent, or Firm* — Venable LLP

(57) ABSTRACT

A method of forming a medium for gas adsorption includes providing a medium substrate with a de-functionalized hygroscopic layer, covering at least a portion of the medium substrate with a solution of an amine and a solvent, and removing excess solution from the medium substrate by evaporation to leave a coating of the amine on the substrate.

16 Claims, 5 Drawing Sheets

FIG. 3

REGENERABLE ROTOR AND METHOD OF MANUFACTURE

FIELD OF THE INVENTION

This invention relates to sorbent technology for scrubbing a gas, such as carbon dioxide ($CO_2$), from an airstream. In particular, this invention relates to an amine-coated medium for gas adsorption, such as a high surface area rotor, its method of manufacture, and its use. Particularly suitable applications for the medium for gas adsorption, for example, are in continuous low $CO_2$ parts per million (ppm) air supply to habitable environments, and continuous desorbed $CO_2$ ppm air supply to horticulture enclosed environments.

BACKGROUND OF THE INVENTION

Solid and liquid sorbents have been used to scrub or remove $CO_2$ from gases emitted from combustion processes and atmospheric environments, as well as air in closed quarters, such as dwellings and agricultural enclosures. Note, for example, International Publication No. WO 2021/150722. Emphasis on improving indoor air quality has increased in recent years due to more air-cleaning technologies coming to market and the cost to condition outdoor air. Many procedures are performance-based and use mass-balance equations to calculate the required outdoor-air rate for a particular zone based on the contaminants of concern. These procedures consider the effect of air-cleaning equipment in the calculation of the required ventilation rate and often aim to use less outdoor air while maintaining high indoor air quality so as to reduce peak heating and cooling equipment capacities and overall energy consumption. While some air-cleaning technologies are more effective at cleaning certain contaminants than others, most do not have any effect on $CO_2$, which is constantly produced by a building's inhabitants. $CO_2$ concentration is usually controlled by diluting the indoor air with outdoor air containing a lower $CO_2$ concentration.

There is growing concern about the effect of high $CO_2$ levels on the cognitive function of people. ASHRAE Standards 62.1 and 62.2 (which are incorporated herein by reference) set the minimum ventilation requirements for buildings to ensure optimal indoor air quality and minimize negative health effects to occupants. Appendix D to Standard 62.1 notes that indoor $CO_2$ concentrations no higher than 700 ppm above outdoor $CO_2$ concentrations will satisfy a substantial majority (about 80%) of occupants. Adsorbent for removing $CO_2$ can be formed in various shapes, such as independent particles in a fixed bed, or a special-purpose, single monomer shape. Certain $CO_2$ adsorbent materials comprise at least one organic amine, at least one type of high surface area grain, and water, which are combined and dried to form the surface coating for particles or the required form. Note, for example, European Patent Publication No. EP 2 054 151 B1 and U.S. Pat. No. 9,919,287.

Current methodologies utilize sorbent packed beds with solid supported amine sorbent for scrubbing $CO_2$ or other gases from indoor air. The sorbent comprises at least one support particle and at least one organic amine, wherein the organic amine and support particles are aggregated to form larger pellets, clusters, or shaped form to be used as a fixed bed for flow-through adsorption. The amines include, but are not limited to polyethylenimine (PEI), aziridine, ethanolamine, diethanolamine, triethylenetetramine, tetraethylenepentamine, pentaethylenehexamine, or mixtures thereof. The support particles have a composition of carbon, silica alumina, or a combination thereof. Typically, the support particle is fumed, pyrolytic or precipitated. The solid sorbent for scrubbing $CO_2$ further comprises a chemical activator, such a polyethylene glycol (PEG).

One particular class of solid sorbents for scrubbing $CO_2$ is solid-supported amines (compositions made by organic amine materials and high surface area granules). However, these solid sorbents have certain problems in scrubbing $CO_2$ in atmospheric environments, as follows.

A. High energy penalties are evident in current temperature swing adsorption/sorption technologies due to heating of the sorption media to 60° C. or higher in order to induce a desorption swing.

B. Moisture present in air streams requires an adsorbent that is moisture tolerant. Packed beds can form a moisture-packed volume that can degrade their ability to adsorb $CO_2$.

C. Solid sorbent beds do not allow a continuous sorption process as the sorbent beds need to undergo intermediate regeneration cycles (temperature or pressure swings).

D. Sorbent bed particle movement creates friction between particles due to the flow of air. This friction degrades the granule sorption efficiency and creates a dusted granule carryover phenomenon.

E. Solid sorbent bed systems have high pressure drop across the beds, which requires the systems to utilize high pressure air handling apparatuses that are susceptible to air leakage.

F. Granular sorbents are often made using either expensive solvents or water soluble alcohols, such as ethanol or methanol. These solvents have made the process of making solid sorbents either too expensive for large scale commercial development or too dangerous, as some solvents are flammable.

G. Typically, the solid sorbents comprise very small, functionalized particles which can be carried off with the moving gases or are difficult to handle due to their limited size and shape.

Currently available $CO_2$ habitable atmospheric sorption technologies (mainly packed beds requiring temperature swing adsorption/desorption) are energy intensive. Improved technologies for $CO_2$ capture are necessary to achieve low energy penalties.

Sorbent rotors are known for adsorbing or scrubbing other components in airstreams, such as moisture and volatile organic compounds (VOCs) and $CO_2$. Many of these rotors have a limited useful life and are often discarded in landfills when their lifetimes are expired. A suitable repurposed use of used sorbent rotors would have both economic and ecological benefits.

SUMMARY OF THE INVENTION

In one aspect, the present invention relates to a method of forming a medium for gas adsorption, the method comprising providing a medium substrate with a de-functionalized hygroscopic layer, covering at least a portion of the medium substrate with a solution of an amine and a solvent, and removing excess solution from the medium substrate by evaporation to leave a coating of the amine on the substrate.

In another aspect, the invention relates to a method of converting a medium designed for adsorption of a first gas into a medium designed for adsorption of a second gas different from the first gas. The method comprises providing a medium substrate having a substance capable of adsorption of the first gas, covering at least a portion of the medium substrate with a solution of an amine and a solvent, the amine being capable of adsorption of the second gas, and removing excess solution from the medium substrate by evaporation to leave a coating of the amine on the substrate.

In still another aspect, the invention relates to a medium for gas adsorption comprising a medium substrate initially provided with a de-functionalized hygroscopic layer, and a coating of an amine and a solvent provided on at least a portion of the de-functionalized hygroscopic layer.

These and other aspects, objects, features, and advantages of the invention will become apparent from the following detailed description of illustrative embodiments thereof, which is to be read in connection with the accompanying drawings.

BRIEF DESCRIPTION OF THE DRAWINGS

FIG. 3 is a flow chart describing the steps to manufacture the sorbent rotor in accordance with the invention.

DETAILED DESCRIPTION OF THE PREFERRED EMBODIMENTS

As noted above, currently available $CO_2$ habitable atmospheric sorption technologies (mainly packed beds requiring temperature swing adsorption/sorption) are energy intensive, so improved technologies for $CO_2$ capture are necessary to achieve low energy penalties as well as to overcome the other noted deficiencies of packed bed systems. Sorbent rotors are known for adsorbing or scrubbing other components in airstreams, such as moisture and volatile organic compounds (VOCs). Note, for example, the Rotor System (RS) and Integrated Zeol System (IZS) manufactured by Munters Corporation. In comparison, sorbent beds with monoliths ranging from 0.1 mm to 10 mm in size will have a smaller impregnated surface area in comparison with the titanium silica gel rotor on an air pass cross-sectional area basis (the porous hygroscopic coating of an exemplary rotor is about 10 to 20 μm on each side of the foil). The exemplary rotor also has less friction losses, i.e., packed bed particles are susceptible to granule mass friction under air movement and will degrade in their sorption capacity over time. The exemplary rotor takes less time to regenerate during temperature swings, i.e., packed beds have the intermediate temperature swing requirement for regeneration purposes in comparison to a continuous regeneration process. Further, packed beds are sensitive to alternating vapor pressure. Large particles in a compact sorption bed are susceptible to moisture accumulation and degradation of available functionalized pore surface area. On the other hand, a rotor with a hydrophobic surface treatment would have better management of this phenomenon. A rotor with hydrophobic properties makes it difficult for fine pores and capillaries, in which the moisture tends to condense, to become blocked so as to reduce sorption capacity. In sum, a rotary sorption system would be preferred over a packed bed sorption system. The inventor has devised a method of forming a rotary sorption system that is effective in scrubbing certain gases, particularly carbon dioxide, from airstreams.

Figure 1:
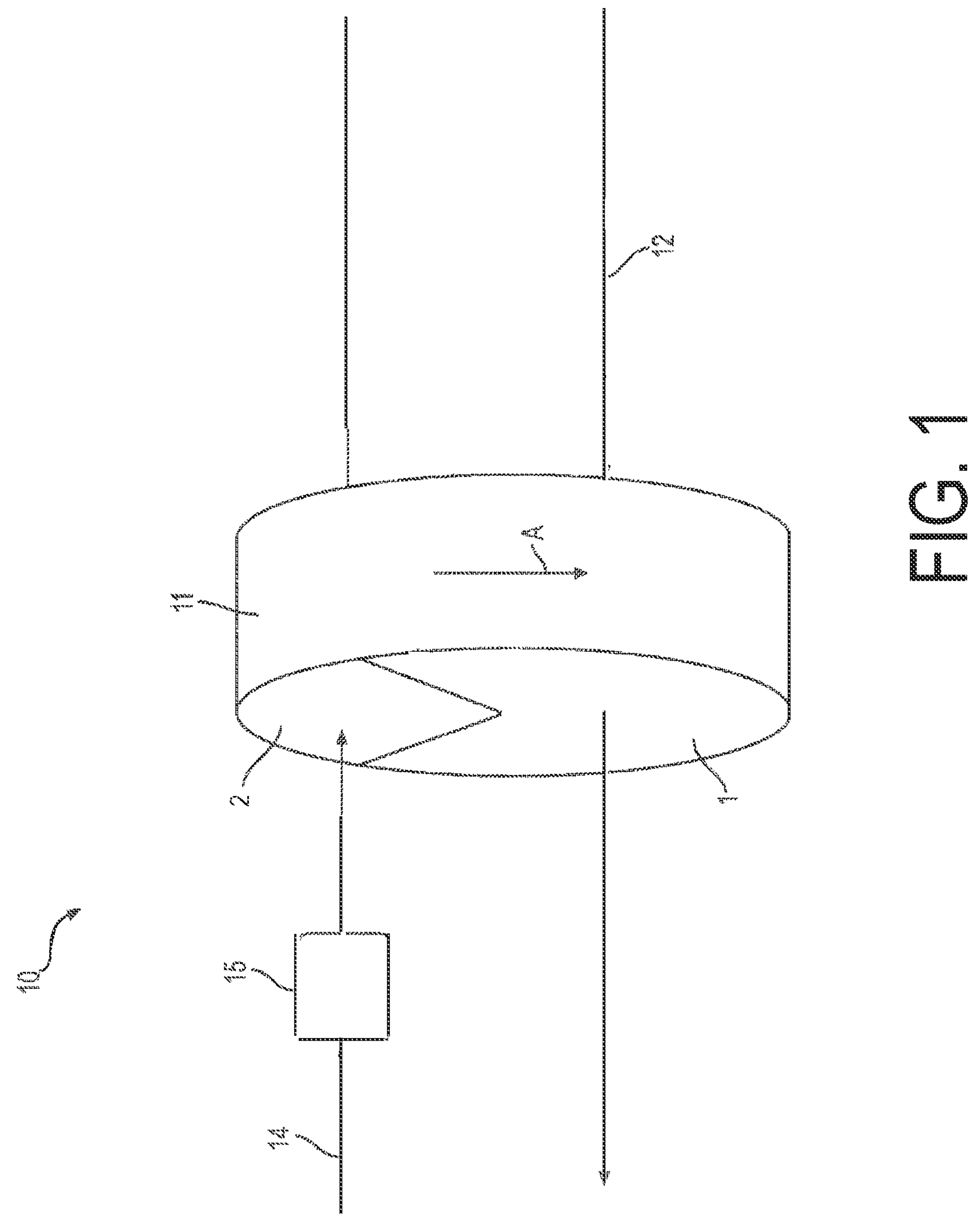
FIG. 1 is a schematic flow diagram illustrating a preferred embodiment of a rotary sorption system in accordance with the invention.
Figure 2:
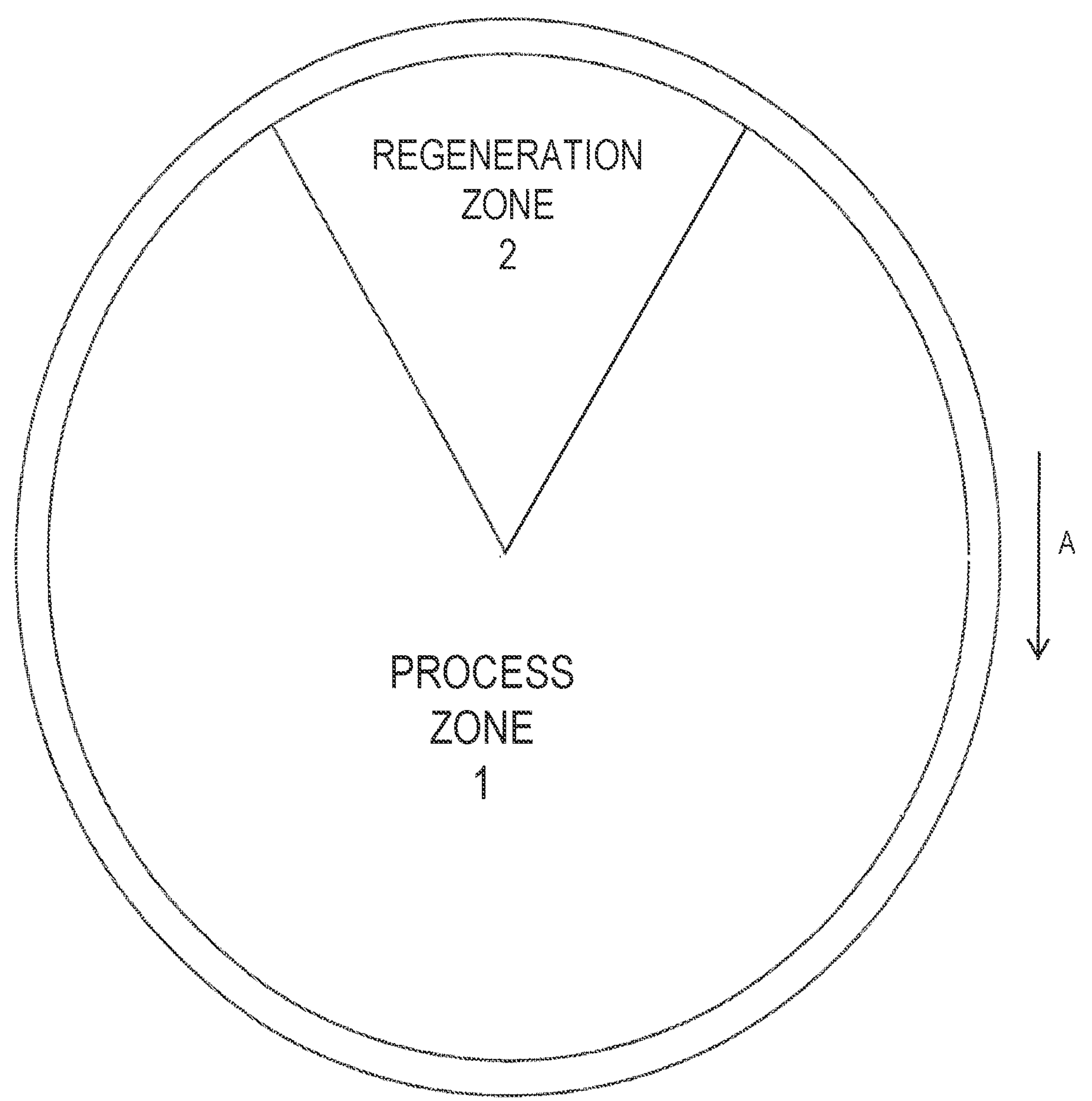
FIG. 2 is a schematic view of the sectors of a sorbent rotor in a preferred embodiment of the rotary sorption system in accordance with the invention.
Figure 4:
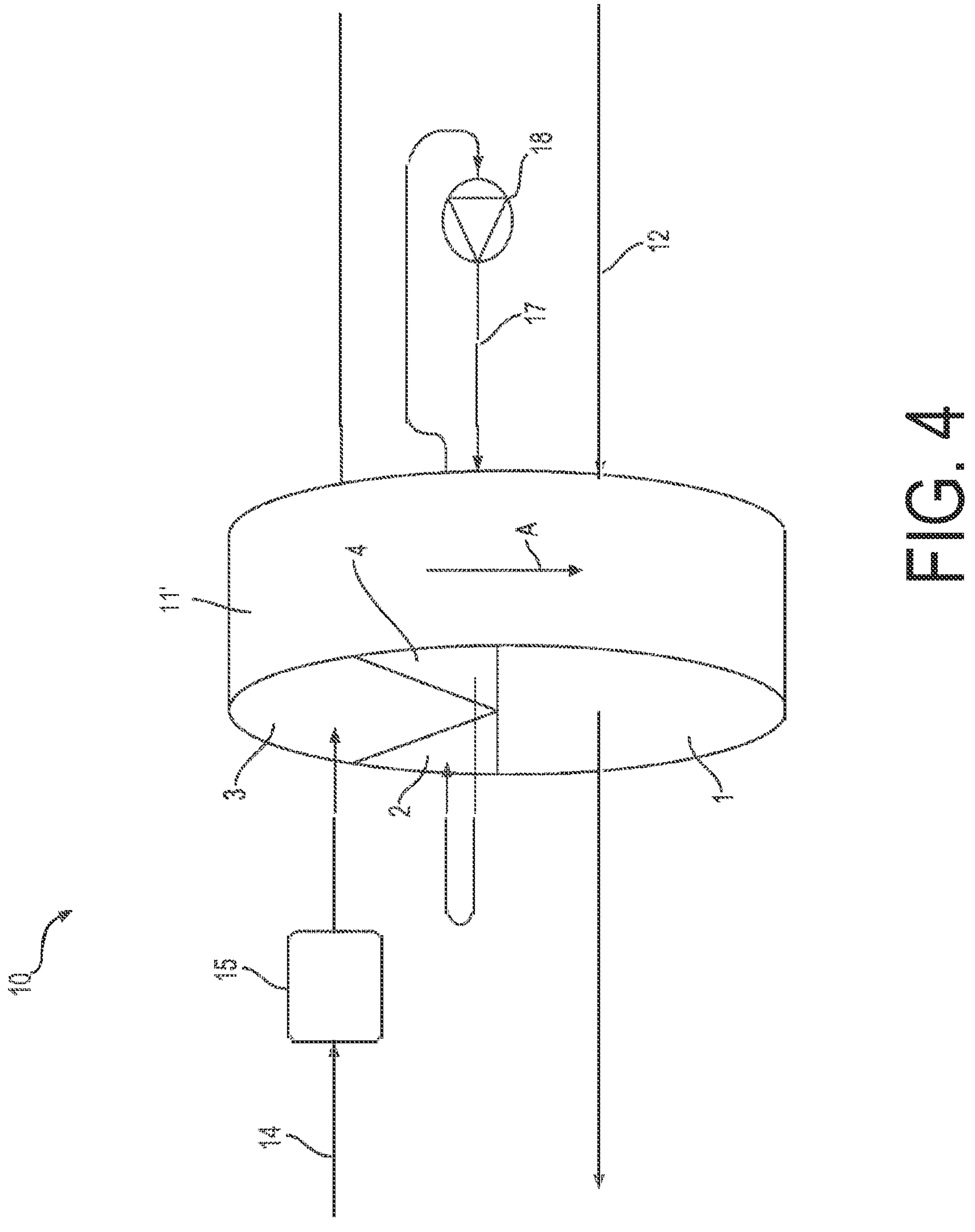
FIG. 4 is a schematic flow diagram illustrating another preferred embodiment of a rotary sorption system in accordance with the invention.
Figure 5:
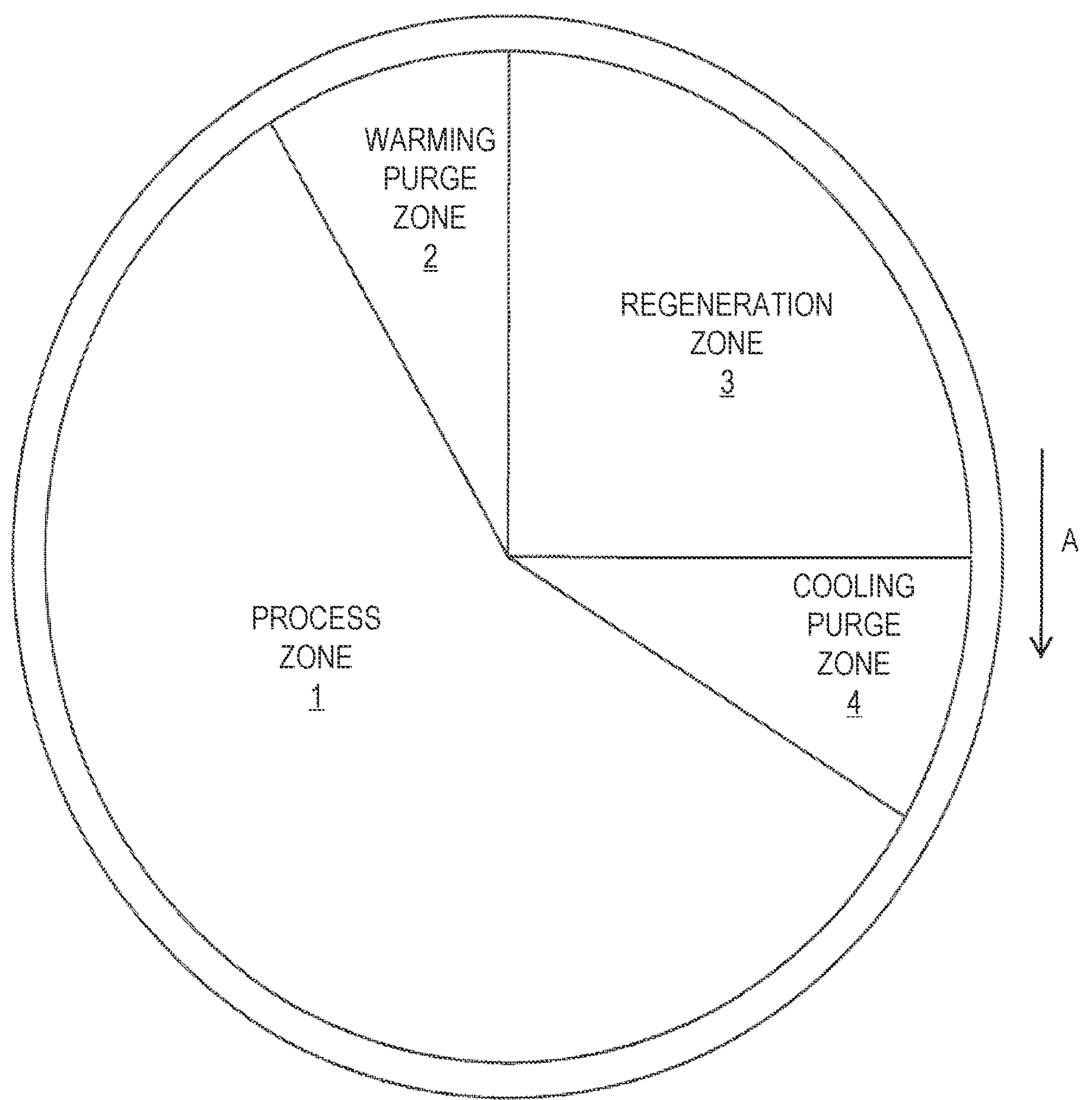
FIG. 5 is a schematic view of the sectors of a sorbent rotor in the other preferred embodiment of the rotary sorption system in accordance with the invention.

FIGS. 1 and 2 illustrate a preferred embodiment of a rotary sorption system 10 in accordance with the present invention. The system includes a rotating disk-shaped porous rotor 11 containing or coated with regenerable sorbent material that, in a cycle of operation, sequentially passes through at least two zones, namely, a first zone 1 and a second zone 2. The sorbent rotor 11 is rotated about its axis in the direction indicated by arrow A by a known rotor mechanism (not shown). The two zones can be identified as a process zone 1, through which process air flows, and a regeneration zone 2, through which heated regeneration air flows. The invention is not to be limited to two zones, and more than two zones can be provided. As non-limiting examples, three zones can be used by adding a purge zone, and, as shown in FIGS. 4 and 5, four zones can be used by adding two recycle zones and/or a purge zone.

Referring to the first embodiment illustrated in FIGS. 1 and 2, a process fluid stream 12 (e.g., air) carrying a sorbate (e.g., carbon dioxide ($CO_2$)) is passed through the sorbent rotor 11 in the first zone 1, where the sorbate is sorbed (i.e., loaded) onto the sorbent rotor 11. The process fluid stream exiting the sorbent mass has a reduced sorbate concentration compared to the process fluid stream entering the sorbent mass. A fan, blower, or other fluid-moving device 13 can be used to drive the process fluid flow through ductwork (not shown). In the example, the sorbate is $CO_2$ and the system 10 functions as a $CO_2$ scrubber.

A regeneration fluid stream 14 is passed through the sorbent rotor 11 in the second zone 2, preferably in a direction opposite to the flow of the process fluid stream 12. The sorbate from the process fluid stream that was collected in the sorbent mass 11 (in this example, $CO_2$) is released into the regeneration fluid stream. A heater 15 can be provided to heat the regeneration fluid stream 14 prior to its passing through the sorbent mass 11. As with the process fluid stream, a fan, blower, or other fluid-moving device 16 can be used to drive the regeneration fluid flow.

The majority of energy required for the sorbing process is used to heat the reactivation airstream, and in the first embodiment, much of that heat from the reactivation zone passes into the process airstream, because the process zone 1 is immediately adjacent the regeneration zone 2. In order to minimize this effect, referring to the second embodiment illustrated in FIGS. 4 and 5, the system includes a rotating disk-shaped porous rotor 11', in which the regenerable sorbent material sequentially passes through four zones, namely, in order, a first zone 1, a second zone 2, a third zone 3, and a fourth zone 4. In a minor modification to the description in the first embodiment, the first and second zones have been renumbered and can be identified as the process zone 1 and the regeneration zone 3. The second and fourth zones 2, 4 are interposed between the process zone 1 and the regeneration zone 3, that is, at the leading and trailing edges of each of the process zone 1 and the regeneration zone 3. A purge fluid stream 17 is passed through the sorbent rotor 11' in the fourth, cooling purge zone 4 after the third, regeneration zone 3, and then directed back through the second, warming purge zone 2 as a purge fluid loop. The purge fluid loop recovers waste heat from the hottest section of the rotor 11' and uses it to help with reactivation, and also reduces the discharge temperature of the process air, resulting in lower energy costs for post cooling. As with the process and regeneration fluid streams, a fan, blower, or other fluid-moving device 18 can be used to drive the purge fluid flow through ductwork (not shown). As noted previously, the present invention is not limited to the two- and four-zone rotors as described above, and can cover rotors with various numbers of zones.

As noted above, sorbent rotors for removing moisture and certain volatile organic compounds (VOCs) are known. In order to effectively remove or scrub $CO_2$ from the process stream 12, the sorbent rotor 11 must be provided with a sorbent substance that can adsorb the $CO_2$. Organic amines are known to adsorb $CO_2$, and include, but are not limited to polyethylenimine (PEI), aziridine, ethanolamine, diethanolamine, triethylenetetramine, tetraethylenepentamine, pentaethylenehexamine, or mixtures thereof. The inventor has found that branched polyethylenimine (BPEI) can be particularly effective in $CO_2$ scrubbing and would be effective in a rotary scrubbing system.

While this disclosure contemplates manufacturing dedicated hydrophobic $CO_2$ scrubber rotors from basic components, this disclosure further includes a method to convert existing hygroscopic rotor wheels into hydrophobic $CO_2$ scrubber rotors to allow for continuous scrubbing while accommodating flow rates suitable for applications such as indoor ventilation or atmospheric $CO_2$ continuous adsorption and desorption. The inventor has further discovered how to incorporate organic amines, particularly BPEI, into known sorbent rotors to achieve a $CO_2$-scrubbing sorbent rotor that has unexpected attributes. The resulting rotor $CO_2$ adsorbent will undergo air exchanges that will minimize moisture pocket formation, have low pressure drops thereacross, and have minimal energy penalties while undergoing adsorption/sorption processes. No known rotor is available to date with the functionality of performing continuous $CO_2$ sorption for habitable environments and that has been manufactured using wet impregnation performed after the sheeting has been corrugated and fashioned into the form of a rotor.

Current rotors designed for moisture and/or VOC sorption undergo numerous operations required to provide the rotors with the desired properties. The material from which sheets forming the sorption substrate are formed are impregnated with several substances in order to achieve the mechanical strength required, particularly when wet. Current rotors designed for moisture and/or VOC sorption allow for a hygroscopic coating to be concentrated by repeated immersion in an aluminate solution in a first treatment step. In addition, a crushed or pulverized solid adsorption medium is introduced into the aluminate solution at some stage of the immersion process. The rotor, once treated with aluminate, is immersed in water-glass and then exposed to carbon dioxide. This gives an additional coating of chemically precipitated silicon dioxide (or silica), which also increases porosity. All of these inherent current state of the art properties of the rotor are critical for the BPEI and PEG wet impregnation treatment for $CO_2$ adsorption as described below.

The forgoing manufacturing steps for rotors designed for moisture and/or VOC sorption can be included as the first steps in the manufacturing process of dedicated hydrophobic $CO_2$ scrubber rotors from basic components. The following steps are for functionalizing or converting those existing rotors, unused or to be recycled, to allow $CO_2$ capture in the presence of water at ambient temperatures. That is, the following steps are either the subsequent steps in the manufacturing process of dedicated hydrophobic $CO_2$ scrubber rotors from basic components or the complete steps in the conversion manufacturing process. The following steps are described with respect to the flow chart of FIG. 3 and treat a sorbent substrate utilizing a liquid impregnation technique allowing $CO_2$ capture in the presence of water at ambient temperatures and being regenerable at temperatures below 50° C. The technique uses a solvent with an organic amine, such as branched polyethylenimine (BPEI), to conduct wet impregnation on high surface area rotors. While BPEI is preferred, the present invention is not to be limited to BPEI and other amines can be used. What is important is the ability for impregnation/functionalization of the amine material on the micro/nano-pore structure of the rotor substrate. The amine deposition into the substrate increases the $CO_2$ affinity sites between the adsorbent and the $CO_2$, which, in turn increases $CO_2$ adsorption selectivity and capacity. BPEI, for example, has branched chains with many $CO_2$ capturing amino groups. BPEI is preferred due to its lower branched amines and lower heat of adsorption (which is an exothermic process), in comparison to that of a primary amine (less energy to adsorb). The proposed amines will be mixed on the support material with a solvent of water and a water-soluble polymer, for example, polyethylene glycol (PEG). PEG at the amine sites will increase the rate of adsorbed $CO_2$, increase the formation of weakly adsorbed $CO_2$, and may decrease the requirement for high temperature peaks during the desorption process. Then, the excess solvent is removed by evaporation of the diluted solution. The wet impregnation will allow for high amine capacity. The rotor formed shape with mesoporous silica will become amine-functionalized; that is, amine groups will become covalently bound to the surface of rotor silica.

Figure 3:
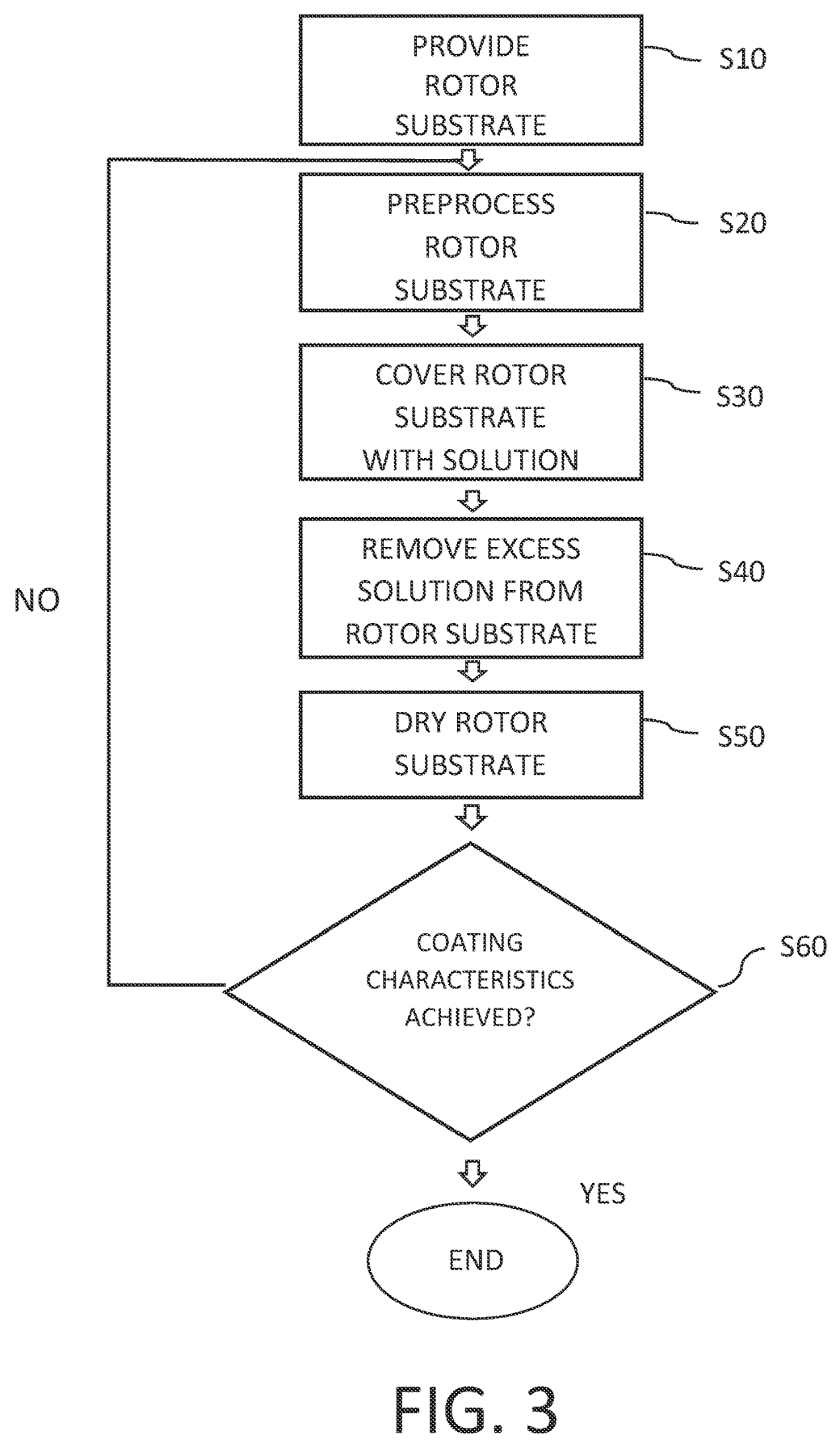

Referring to FIG. 3, a preferred embodiment of a manufacturing method of the rotor of the present invention will be described. In step S10, a rotor substrate is provided. This step entails either providing an existing rotor, used or unused, designed for scrubbing other gaseous components, or manufacturing such a rotor from basic components. Existing rotors, particularly those from Munters Corporation designed for moisture and/or VOC sorption, possess excellent hygroscopic properties while being made from a simple manufacturing process with low-cost substrate materials. However, in scrubbing $CO_2$, hydrophobic materials are preferred as accumulated moisture will deleteriously affect the $CO_2$ scrubbing efficiency, as described above, and can affect the underlying structure of the rotor substrate. Therefore, the underlying rotor selected is preferably of the lowest hygroscopic properties. The selected rotor preferably comprises layers of foils corrugated to form a plurality of continuous channels for gas streams, the surface of the foils having a porous hygroscopic coating of titanium silica gel. Examples of suitable rotors include HPS (High Performance Silicagel), HCR, HPX, Quantum™, and TiGel rotors manufactured by Munters Corporation. In step S20, the selected rotor substrate is preprocessed. This can entail preparing the surface of the rotor for wet impregnation by drying it at 20 mTorr at 100° C. for 12-16 hours, but these conditions are not limiting.

The preferred manufacturing process utilizes the porous hygroscopic structure inherent to the selected rotor and allow a BPEI-solvent solution to be deposited into the porous structure as part of a wet impregnation process in step S30. In this process, the organic amine is mixed with water and PEG to be deposited in the rotor foil formed flutes. The rotor foils are treated with the aqueous solution, which has a ratio of BPEI to the water and PEG mixture between, for example, 1:7 to 1:4 by weight, but this range is not to be limiting. Preferably, the treatment with the solution includes either immersing the completed rotor into a bath of the aqueous BPEI/PEG solution or applying the solution to the rotor in a sufficiently large quantity to effect the treatment, e.g., by pouring the solution over the rotor. When effected in a bath, the bath is suitably at room temperature or somewhat lower and the treatment time is relatively short, e.g., 10-30 minutes. In this way, the channels of the rotor are at least partially filled with the solution so that the surfaces of the foils are impregnated and so that the existing coating forms a surface deposition of the BPEI/PEG.

In step S40, the excess solution is removed from the rotor substrate. If the solution bath is used, the rotor substrate is removed from the bath or the bath is drained. If the solution is poured over the rotor substrate, then the pouring is ceased. After the rotor is lifted from the impregnation bath, the bath is drained, or the supply of solution is stopped, substantially all of the solution leaves the channels excepts for a film or a skin of the solution which remains on the surfaces of the rotor. This film is more easily retained by turning the rotor immediately after emptying of the solution so that the axis of the rotor is brought to a horizontal position.

After the excess solution is removed from the rotor, the rotor is subject to a drying process in step S50 until a dry state rotor weight and BPEI/PEG layer is attained. This can be determined by weighing the rotor after preprocessing in step S20, then weighing the rotor again after complete drying in step S50, and calculating the weight differential as the deposition dry weight. Preferably, the organic amine amounts deposited on the rotor will be within a range of 10% to 40% by weight, but such is not limiting and the target range can be determined based on the desired characteristics of the rotor, which will depend on its intended use and environmental conditions. If this range is not achieved (NO in step S60), the rotor is re-immersed in the aqueous BPEI/PEG solution and the process is repeated from step S30 until the BPEI is completely deposited and solvents removed. If the desired range of coating characteristics is achieved (YES in step S60), the process ends. The drying step S50 can encompass heat drying, air drying, or vacuum processing.

This BPEI/PEG coating is created in the foregoing process as follows. The BPEI/PEG liquid in the channels of the rotor is converted by generating heat and subjecting the foils of the rotor to a substantial rise in temperature so that BPEI/PEG that is deposited on the surfaces adheres to the rotor's de-functionalized hygroscopic coating that consists mainly of hydrogels. This process induces the covalent conjugation of the BPEI/PEG to the hydrogel layer through the amine bonds and completes the dual polymer functionalized silica, although other processes or reactions may occur depending on the underlying substrate materials and utilized chemicals. This subsequent reaction step (drying of the wheel: heat drying, air drying, or vacuum processing) preferably continues for longer than the immersion step, preferably as long as liquid remains in the channels. When the reaction has ceased, the rotor will retain its dry state weight and the deposited dual polymers. The coating may be further strengthened by allowing the foils of the rotor time to age during the reaction stage in a low $CO_2$ environment.

The resulting rotor substrate with a functionalized BPEI layer allows for large surface areas with pore channels to be regenerable and readily available for continuous dry scrubbing. The product will be useful for scrubbing $CO_2$ from non-industrial, habitable, biological and atmospheric emissions. For the wet impregnation, a rotor with low hygroscopicity is preferred. This will enhance the formation of a hydrophobic surface to maintain the amine groups and contain them in the hydrophobic surface.

This resulting core rotor can be used as a small-size $CO_2$ scrubbing unit or can be housed in a dual stream, single heat source air handling unit for institutional, commercial, residential, retail or healthcare facilities. The core rotor allows for continuous $CO_2$ scrubbing technology to habitable/animal husbandry/horticultural environments while maintaining low operational costs. The $CO_2$-adsorbed process side will allow for compliance with indoor air quality regulations for dedicated environments, particularly the ASHRAE 62.1 standard. The regenerative side will allow for increased horticulture productivity.

Although this invention has been described in certain specific exemplary embodiments, many additional modifications and variations will be apparent to those skilled in the art in light of this disclosure. It is, therefore, to be understood that this invention may be practiced otherwise than as specifically described. Thus, the exemplary embodiments of the invention should be considered in all respects to be illustrative and not restrictive, and the scope of the invention to be determined by any claims supportable by this application and the equivalents thereof, rather than by the foregoing description.

What is claimed is:

1. A method of forming a medium for gas adsorption, the method comprising:

providing a medium substrate with a de-functionalized hygroscopic layer;

covering at least a portion of the medium substrate with a solution of an amine and a solvent; and removing excess solution from the medium substrate by evaporation to leave a coating of the amine on the substrate, wherein a resulting surface on the substrate is hydrophobic.

2. The method of claim 1, wherein the amine comprises branched polyethylenimine (BPEI).

3. The method of claim 1, wherein the solvent comprises water and polyethylene glycol (PEG).

4. The method of claim 1, wherein the medium substrate is in the form of a rotor.

5. The method of claim 1, wherein the step of removing excess solution comprises separating the medium substrate and the solution and drying the medium substrate.

6. The method of claim 1, wherein the step of covering the medium substrate with the solution comprises immersing the medium substrate in the solution.

7. The method of claim 1, wherein the substrate is provided with a coating of titanium silica as the de-functionalized hygroscopic layer prior to the covering step.

8. The method of claim 7, further comprising drying the medium substrate prior to the covering step.

9. A method of converting a medium designed for adsorption of a first gas into a medium designed for adsorption of a second gas different from the first gas, the method comprising:

providing a medium substrate having a substance capable of adsorption of the first gas;

covering at least a portion of the medium substrate with a solution of an amine and a solvent, the amine being capable of adsorption of the second gas; and removing excess solution from the medium substrate by evaporation to leave a coating of the amine on the substrate, wherein a resulting surface on the substrate is hydrophobic.

10. The method of claim 9, wherein the amine comprises branched polyethylenimine (BPEI).

11. The method of claim 9, wherein the solvent comprises water and polyethylene glycol (PEG).

12. The method of claim 9, wherein the medium substrate is in the form of a rotor.

13. The method of claim 10, wherein the step of removing excess solution comprises separating the medium substrate and the solution and drying the wet medium substrate.

14. The method of claim 9, wherein the step of covering the medium substrate with the solution comprises immersing the medium substrate in the solution.

15. The method of claim 9, wherein the substance capable of adsorption of the first gas comprises a coating of titanium silica.

16. The method of claim 15, further comprising drying the medium substrate prior to the covering step.

* * * * *